(12) United States Patent
Murai

(10) Patent No.: US 9,022,577 B2
(45) Date of Patent: May 5, 2015

(54) LIGHT SOURCE DEVICE AND PROJECTION DISPLAY APPARATUS

(71) Applicant: Toshiharu Murai, Kanagawa (JP)

(72) Inventor: Toshiharu Murai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 110 days.

(21) Appl. No.: 13/649,413

(22) Filed: Oct. 11, 2012

(65) Prior Publication Data

US 2013/0107230 A1    May 2, 2013

(30) Foreign Application Priority Data

Oct. 31, 2011  (JP) ................................. 2011-238619
Sep. 7, 2012   (JP) ................................. 2012-197322

(51) Int. Cl.
*G03B 21/20*      (2006.01)
*H04N 9/31*       (2006.01)

(52) U.S. Cl.
CPC ............ *G03B 21/204* (2013.01); *H04N 9/3114* (2013.01); *H04N 9/3155* (2013.01)
USPC ................... 353/85; 353/31; 353/84; 353/94; 362/231; 362/509

(58) Field of Classification Search
CPC .... G03B 21/14; G03B 21/204; H04N 9/3164; H04N 9/3197; B62J 6/18; B62J 6/20; B60Q 1/326
USPC ........................ 353/30, 31, 38, 84, 85, 94, 98; 345/82–84, 87, 110; 362/84, 231, 308, 362/326–327, 509–510; 348/743–747; 349/5, 7–9
See application file for complete search history.

(56) References Cited

U.S. PATENT DOCUMENTS

| 8,523,367 B2* | 9/2013 | Ogura ............................. 353/84 |
| 8,616,708 B2* | 12/2013 | Masuda .......................... 353/84 |
| 2009/0284148 A1 | 11/2009 | Iwanaga |
| 2010/0238412 A1 | 9/2010 | Kurosaki |
| 2010/0328554 A1* | 12/2010 | Shibasaki ..................... 348/760 |
| 2010/0328632 A1* | 12/2010 | Kurosaki et al. ................ 353/98 |
| 2011/0043764 A1 | 2/2011 | Narikawa |

(Continued)

FOREIGN PATENT DOCUMENTS

| CN | 101581410 A | 11/2009 |
| CN | 101923273 A | 12/2010 |

(Continued)

OTHER PUBLICATIONS

Combined Chinese Office Action and Search Report issued Sep. 2, 2014 in Patent Application No. 201210595847. X (with English language translation).

(Continued)

*Primary Examiner* — Sultan Chowdhury
(74) *Attorney, Agent, or Firm* — Oblon, McClelland, Maier & Neustadt, L.L.P.

(57) ABSTRACT

A light source device includes an excitation light source configured to emit and stop an excitation light with a predetermined timing, a fluorescent wheel configured to rotate, the fluorescent wheel including a fluorescent material applied thereon for emitting a fluorescent light in a predetermined wavelength range when irradiated with the excitation light, and an irradiation spot changing unit configured to change a spot on the fluorescent material irradiated with the excitation light.

13 Claims, 12 Drawing Sheets

(56) References Cited

U.S. PATENT DOCUMENTS

| | | | |
|---|---|---|---|
| 2011/0075103 A1* | 3/2011 | Ogawa et al. | 353/31 |
| 2011/0096296 A1 | 4/2011 | Ogawa | |
| 2011/0096300 A1 | 4/2011 | Shibasaki | |
| 2011/0242497 A1 | 10/2011 | Fukano | |
| 2011/0242502 A1 | 10/2011 | Shibasaki | |
| 2011/0317131 A1* | 12/2011 | Miyazaki | 353/31 |

FOREIGN PATENT DOCUMENTS

| | | |
|---|---|---|
| CN | 102033397 A | 4/2011 |
| CN | 102200683 A | 9/2011 |
| JP | 4662185 | 1/2011 |
| JP | 2011-095391 | 5/2011 |
| JP | 2011-095392 | 5/2011 |
| JP | 2012-150349 | 8/2012 |

OTHER PUBLICATIONS

European Office Action for Application No. 12188967.9-1560 dated Feb. 12, 2015.

\* cited by examiner

LIGHT SOURCE DEVICE AND PROJECTION DISPLAY APPARATUS

CROSS-REFERENCE TO RELATED APPLICATIONS

The present application claims priority to and incorporates by reference the entire contents of Japanese Patent Application No. 2011-238619 filed in Japan on Oct. 31, 2011 and Japanese Patent Application No. 2012-197322 filed in Japan on Sep. 7, 2012.

BACKGROUND OF THE INVENTION

1. Field of the Invention

The present invention relates to a light source device and a projection display apparatus provided with such a light source device.

2. Description of the Related Art

In recent years, large-screen display apparatuses are rapidly becoming popular. Meetings, presentations, seminars and the like using such display apparatuses are becoming common.

As display apparatuses, various kinds of displays are known such as LCDs (Liquefied Crystal Displays) and PDPs (Plasma Display Panels). They are appropriately selected depending on a size of a room where such a display apparatus is used or the number of people attending such a meeting, presentation, seminar and the like. Among them, projectors are the most widespread large-screen display apparatuses, since they are not so expensive and superior in their portability (that is, they are light, small and portable).

In such a background, recently, situations and occasions involving communications are more increasing. For example, many offices are provided with small meeting rooms, or meeting spaces or cubicles divided with partitions or the like, where meetings involving projectors are often held.

Furthermore, even in the case that there is no vacant meeting room and the like, for example, urgent needs for meetings utilizing available spaces such as aisles while projecting information slides or images on walls of such available spaces by means of projectors are becoming more common.

As a typical example of projectors, there is known a so-called DLP (registered trademark) type projector provided with a display device such as a DMD (Digital Micromirror Device) capable of modulating irradiation light by, with PWM driving, rapidly switching on/off angles of each of micromirrors which are pixels arranged in a matrix, depending on image data.

In the DLP type projector, owing to the high speed operation of the DMD, color images such as R (red), G (green) and B (blue) color images can be switched at a certain time interval to be sequentially displayed. Thus, it has an advantage in downsizing.

In such a projector, for example, a high intensity discharge lamp (HID lamp) such as an extra high pressure mercury lamp was conventionally used as a light source. Recently, however, solid state light emitting devices such as red, green and blue LEDs are used as light sources. Furthermore, fluorescent materials using the light emitted from such solid state light emitting devices as excitation light to emit light in another wavelength range are also used as light sources. Products using such light sources have been launched onto the market.

For example, Japanese Patent No. 4662185 discloses a light source device provided with a solid state light source for emitting visible light, a fluorescent layer for converting the visible light emitted from the solid state light source into visible light in another wavelength range, and a transparent base material or substrate, as well as a projector using such a light source device.

In prior arts such as Japanese Patent No. 4662185, however, fluorescent materials for all colors to be displayed are arranged or applied on a fluorescent wheel in a circumferential direction, and the fluorescent wheel is irradiated with the excitation light all the time. Therefore, fluorescent materials are heated to decrease the luminous efficiency, so that a high quality image is not displayed. Otherwise, the time degradation of fluorescent materials is accelerated to shorten the lifetime thereof.

In order to solve the above problems, technologies are disclosed by Japanese Patent Application Laid-open No. 2011-95391 and Japanese Patent Application Laid-open No. 2011-95392. These technologies use projector light sources individually for each color required to be displayed. Thus, fluorescent wheels are provided individually for each color. Each fluorescent wheel emits only a predetermined wavelength of light specific to the excitation light irradiated thereto. Thus, there is no need to irradiate the fluorescent wheel with the excitation light all the time. Therefore, it is intended to prevent or reduce the decrease of the luminous efficiency due to the heated fluorescent materials.

Furthermore, in Japanese Patent Application Laid-open No. 2011-95391, the emission timing of the excitation light and the rotation speed are controlled, so that a spot or region on the fluorescent wheel irradiated with the excitation light is shifted with time. To the contrary, in Japanese Patent Application Laid-open No. 2011-95392, the emission duration time of the excitation light is controlled so as to synchronize with N rotations (N is an integer) of the fluorescent wheel. Thus, in both cases, it is intended to prevent the time degradation of fluorescent materials by irradiating uniformly the whole fluorescent wheel with the excitation light.

However, technologies disclosed in Japanese Patent Application Laid-open No. 2011-95391 and Japanese Patent Application Laid-open No. 2011-95392 both have a following problem. If the fluorescent layer formed on the wheel has any defect region partially which may affect the image display quality, the image display quality may be deteriorated because of such a defect region.

SUMMARY OF THE INVENTION

It is an object of the present invention to at least partially solve the problems in the conventional technology.

A light source device includes an excitation light source configured to emit and stop an excitation light with a predetermined timing, a fluorescent wheel configured to rotate, the fluorescent wheel including a fluorescent material applied thereon for emitting a fluorescent light in a predetermined wavelength range when irradiated with the excitation light, and an irradiation spot changing unit configured to change a spot on the fluorescent material irradiated with the excitation light.

In an embodiment, the light source device may further include an alarm generating unit configured to generate an alarm, if the emission timing of the excitation light with which the emission light intensity of the fluorescent light in the emission duration time of the fluorescent light in the predetermined period does not become equal to or less than does not exist. The irradiation spot changing unit may include the alarm generating unit.

In an embodiment, the alarm may be generated by generating a sound and/or lighting a light emitting device.

A projection display apparatus includes any of the aforementioned light source devices, two or more kinds of light source devices configured to emit lights each having a wavelength range different from the fluorescent light emitted from the aforementioned light source device, a display device, an illumination optical system configured to irradiate the display device by collecting the fluorescent light and the lights emitted from each of the two or more kinds of light source devices to a predetermined plane, a projection optical system configured to project an image emitted from the display device to a screen, and a display control unit configured to control the light source device and the display device.

In an embodiment, in a case that the alarm generating unit generates the alarm, the display control unit may control the light source device and the display device so as to include a predetermined message in an image to be displayed by the display device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The embodiments of the present invention will now be described with reference to the accompanying drawings.

First Embodiment

Figure 1:
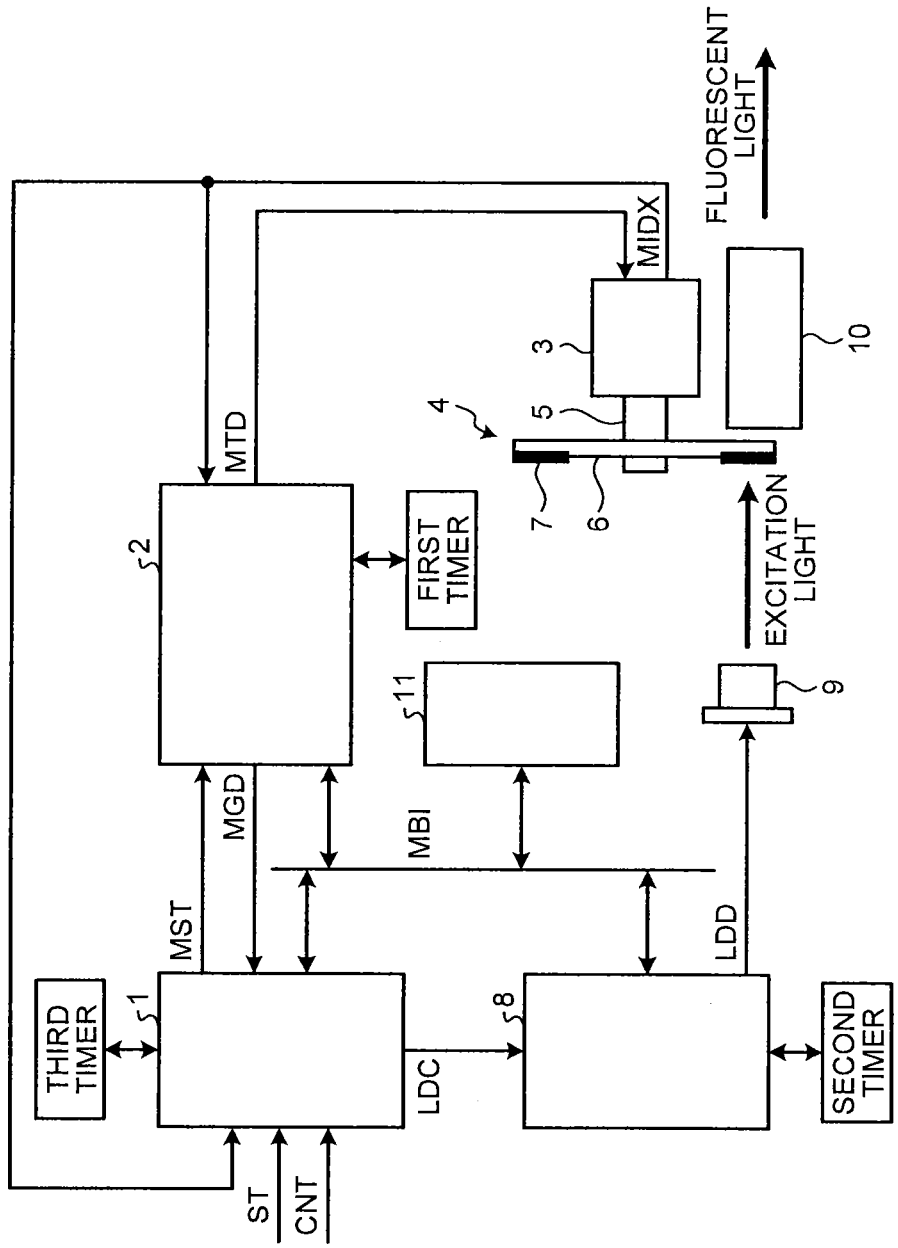
FIG. 1 a schematic view illustrating a light source device according to a first embodiment.

As illustrated in FIG. 1, the light source device is provided with a control unit 1, a motor drive unit 2, a motor 3, a fluorescent wheel 4, and an LD drive unit 8. The control unit 1 acknowledges a motor start signal MST when a start signal ST becomes "1". The motor drive unit 2 outputs a motor drive signal MTD to start driving the motor 3 when the signal MST becomes "1". The fluorescent wheel 4 is attached to a driving shaft 5 of the motor 3 which is rotated on the basis of the motor drive signal MTD.

The fluorescent wheel 4 is provided with a wheel disc 6 and a fluorescent layer 7 formed on the disc. The fluorescent layer 7 contains a fluorescent material for emitting a light in a certain wavelength range, for example a green light, when irradiated with an excitation light in another predetermined wavelength range, for example blue excitation light.

Figure 2:
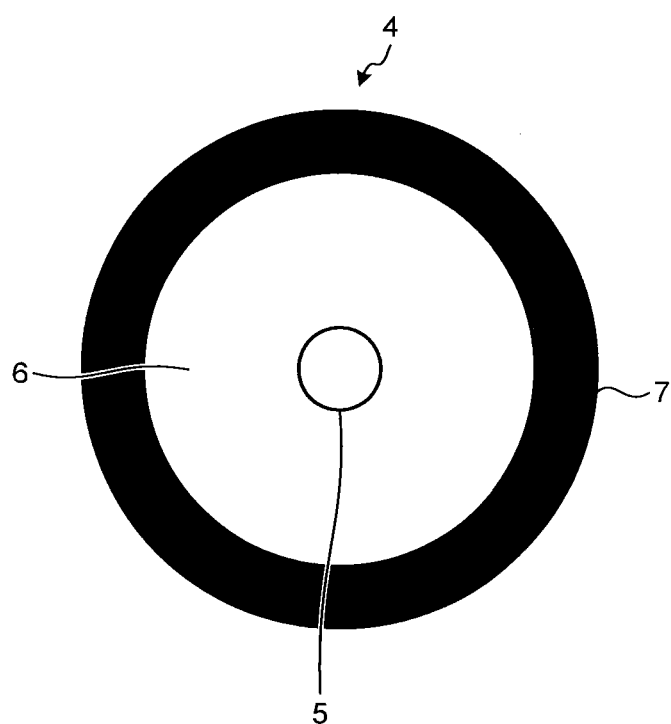
FIG. 2 is a view illustrating a fluorescent layer formed on a fluorescent wheel disc according to the present embodiment.

FIG. 2 illustrates the fluorescent layer 7 formed on the disc 6 of the fluorescent wheel 4 according to the present embodiment. The fluorescent layer 7 is formed on the disc 6 in the entire circumferential direction relative to the rotational shaft 5. As the wheel disc 6, for example, glass material or the like is used to transmit the fluorescent light emitted from the fluorescent layer 7.

The motor 3 is provided with a function to generate a rotation detection signal MIDX indicating a rotation speed of the rotational shaft 5. The rotation detection signal MIDX is output to the motor drive unit 2. This function may be provided with inside of the motor or may be attached to outside of the motor. As an embodiment implementing this function by attaching it to the outside of the motor, for example, there is known a method in which an optical mark is formed on a part of the rotational shaft of the motor, or a part of a component rotating with the rotational shaft of the motor, and the optical mark is detected by a photosensor or the like. The photosensor generates and outputs a pulse "1" every time when detecting the optical mark.

The motor drive unit 2 waits for the input signal MIDX to receive the pulse, when the start signal MST becomes "1" and the motor drive unit 2 starts outputting the motor drive signal. If the pulse is received, the motor drive unit 2 starts a first timer and waits for the next pulse. Then, if the next pulse is received, the motor drive unit 2 compares a time measurement value of the first timer with a rotation speed data of the motor 3 stored therein. If the difference is in a predetermined range, the motor drive unit 2 sets a signal MGD to "1". If not, the motor drive unit 2 sets the signal MGD to "0". Then, the first timer is reset before the next pulse is received by the input signal MIDX.

After that, as long as the signal MST is "1", the motor drive unit 2 repeats the operation in which the first timer is started every time when the input signal receives a pulse, and a time duration until the next pulse is received is measured and compared with the rotation speed data of the motor 3 stored therein, and if the difference is in the predetermined range, the signal MGD is set to "1", and otherwise the signal MGD is set to "0".

The control unit 1 starts a third timer when the signal MGD becomes "1". The time measurement value of the third timer is compared with the emission start timing data of the excitation light stored therein. With a timing when the both data match, a signal LDC is set to "1".

The LD drive unit 8 starts outputting an LD drive signal LDD and starts a second timer. Then, the time measurement value of the second timer is compared with the emission duration time data of the excitation light stored therein. With a timing when the both data match, the output of the signal LDD is stopped.

Figure 3:
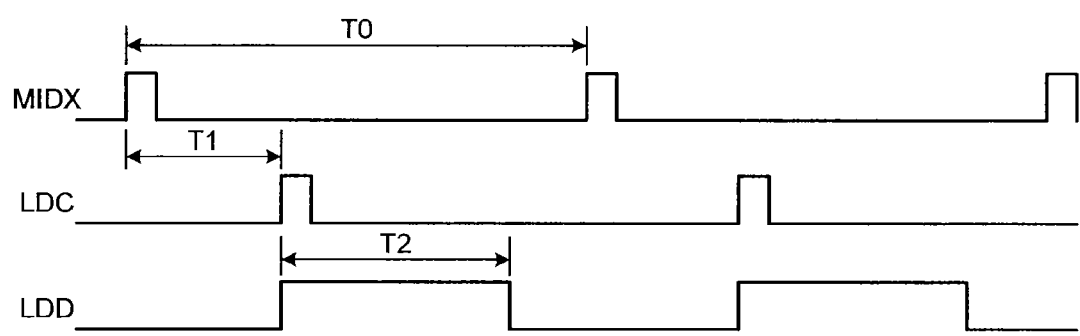
FIG. 3 is a timing chart illustrating an operation of the light source device according to the first embodiment.
Figure 4:
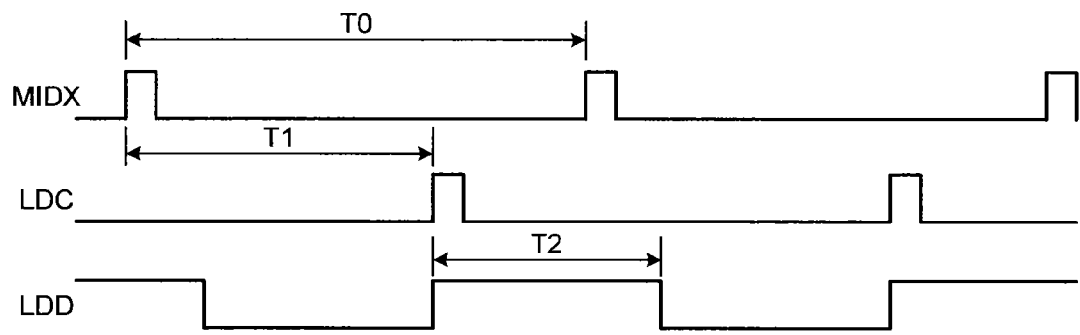
FIG. 4 is a timing chart illustrating an operation of the light source device according to the first embodiment.

FIG. 3 and FIG. 4 are timing charts each illustrating the outputs of the signal LDC and the LD drive signal LDD relative to the rotation detection signal MIDX of the motor 3, based on the aforementioned operational explanation according to the first embodiment. T0, T1 and T2 represents a rotation period of the motor 3, an emission start timing of the LD 9 relative to the rotation of the motor 3, and an emission duration time of the LD 9, respectively.

FIG. 3 refers to a case that the emission duration time of the LD 9 is thoroughly included between pulses of the rotation detection signal MIDX of the motor 3. FIG. 4 refers to a case that the emission duration time of the LD 9 extends over the next pulse generation timing of the rotation detection signal MIDX of the motor 3. Namely, in the light source device according to the present embodiment, the LD 9 can emit the light with a freely arranged timing relative to the rotation of the fluorescent wheel 4.

The LD 9 may be a laser light source for emitting a light having a blue wavelength range, for example. The LD 9 emits the blue light only while the signal LDD is "1". The blue light as the excitation light of the aforementioned fluorescent material irradiates the fluorescent module. The fluorescent light emitted from the fluorescent material transmits the wheel disc 6 and is collected by a collecting optical system 10 and is output to the outside.

In the present embodiment, the rotation speed data of the motor 3, the emission start timing data of the excitation light, and the emission duration time data of the excitation light are stored in a memory 11. The motor drive unit 2, the control unit 1, and the LD drive unit 8, for example, read out the corresponding data from the memory 11 via a memory bus MBI when the device is turned on. The respective read out data are stored in each of resisters provided in the motor drive unit 2, the control unit 1, and the LD drive unit 8, respectively. A signal CNT is a control signal input from an outside. The control unit 1 rewrites the data stored in the memory 11, on the basis of the signal CNT.

Next, effects of the first embodiment will be explained.

In the present embodiment, in the light source device capable of emitting a light in a predetermined wavelength range with a predetermined period, the fluorescent layer 7 is formed on the rotating wheel disc 6 in the circumferential direction. And, the fluorescent wheel is rotated so that a part of the fluorescent layer 7 is irradiated with the excitation light and the light in the predetermined wavelength range is emitted with the predetermined time period. The emission timing of the excitation light can be freely arranged relative to the rotation of the fluorescent wheel.

Thereby, even if the fluorescent layer formed on the fluorescent wheel has any defect region partially which may affect the image display quality, it is possible to emit the light so as to avoid such a defect region.

In general, in the video display apparatus such as a projector and the like, a frame frequency of the projected output video signal may be changed, depending on a kind of input video signal or an input frame frequency.

In contrast, according to the present embodiment, the emission period of the fluorescent layer (fluorescent material) can be changed, and the rotation speed of the fluorescent wheel can be changed synchronously with the emission period of the fluorescent layer. For example, therefore, even if the frame frequency of the projected output video signal changes when applied to a projector and the like, it is possible to deal with the changed frequency. Thus, a light source device having a wide range applicability can be provided.

In general, for example, in the DLP type projector, for the purpose of realizing color rendering properties specific to individual products, the emission duration time of the fluorescent light in one period time duration varies among individual products. Furthermore, in one product itself, various modes of color representations may be switched, and the emission duration time of the fluorescent light may be changeable depending on the modes.

Furthermore, according to the present embodiment, the emission duration time within the emission period of the excitation light can be changed. Therefore, the present embodiment can be applied to various modes of a wide range of projector products. Thus, a light source device having a further wide range applicability can be provided.

As described above, comparing the time duration T0 corresponding to one rotation of the wheel disc 6 with the time duration T2 defined by the irradiation start and the irradiation stop of the excitation light, T0 is longer than T2. The rotation speed of the wheel disc 6 may increase or decrease with a predetermined timing, even during the normal use. According to the configuration as mentioned above, it is possible to prevent only the same spot or region of the fluorescent layer 7 on the wheel disc 6 from being continuously irradiated with the excitation light for a long time.

Alternatively, by providing an emission light intensity detection unit to detect the emission light intensity of the fluorescent light as in the following second embodiment, the rotation speed of the wheel disc 6 may be increased as mentioned above for a predetermined time, when the emission light intensity has any problem.

Second Embodiment

Figure 5:
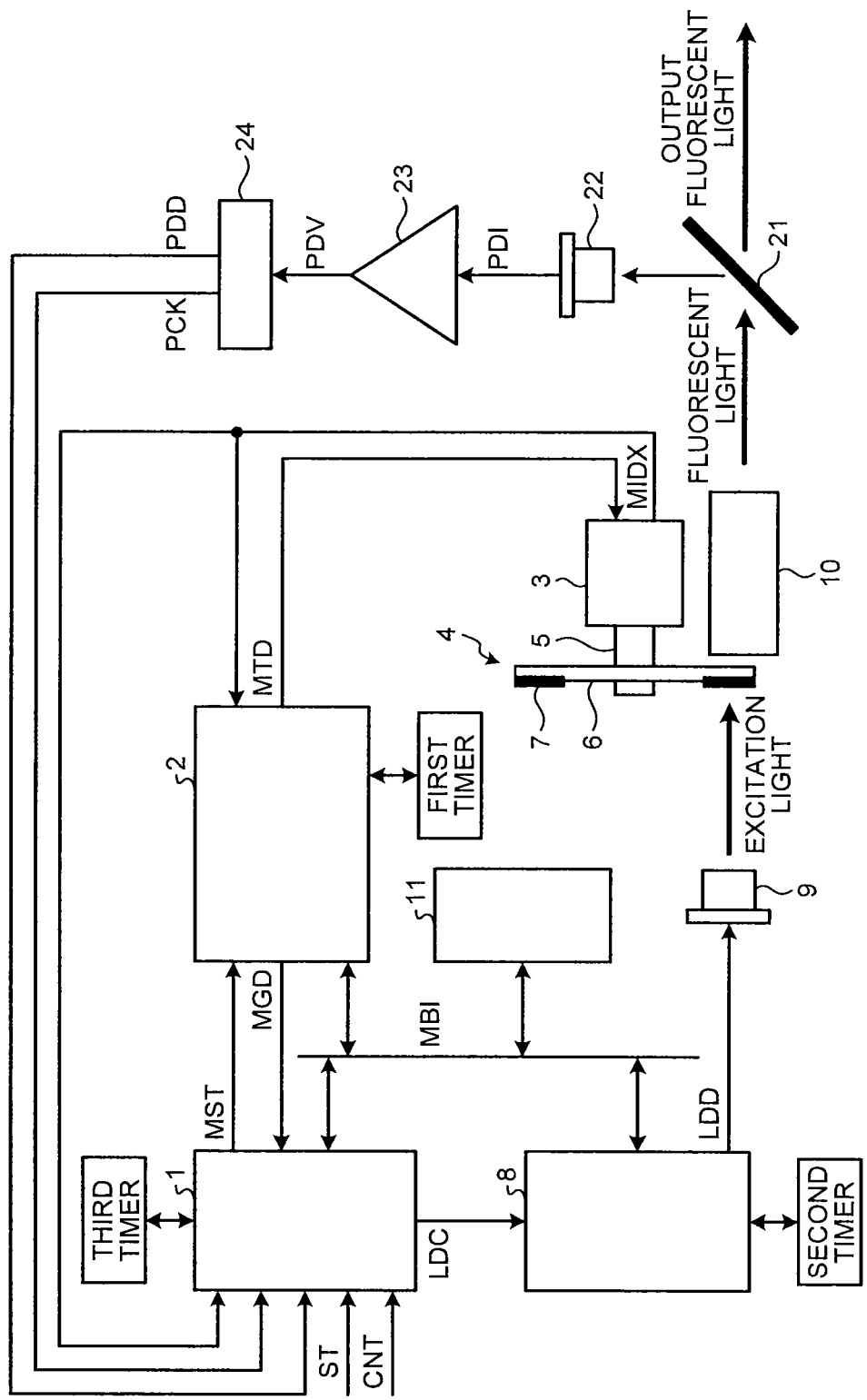
FIG. 5 is a schematic view illustrating a light source device according to a second embodiment.

FIG. 5 schematically illustrates a light source device according to a second embodiment, based on the first embodiment illustrated in FIG. 1. The same configuration with the first embodiment carries the same reference numerals and the explanation thereof is omitted. The difference between the second embodiment and the first embodiment will be described below.

A mirror 21 transmits and outputs most of fluorescent light emitted from the collecting optical system 10. However, a reflection film such as aluminum is deposited on a part of the mirror 21 to reflect a part of the fluorescent light and guide it to a photosensor 22. The photosensor 22 converts the received fluorescent light into a current signal PDI and outputs it. The current signal PDI is converted into a voltage signal PDV by an AMP 23, and further converted into a digital signal PDD by an ADC 24, and input into the control unit 1 synchronously with a clock PCK having a predetermined frequency.

The control unit 1 sequentially compares the input digital signal PDD with the output light data stored therein, synchronously with the clock PCK. If the digital signal PDD is smaller than the output light signal, the control unit 1 rewrites the emission start timing data of the excitation light to control the emission timing of the excitation light. A timing when the value of the input signal PDD excesses the output light data during the whole emission duration time of the excitation light is written and stored as a new emission start timing data into the memory 11.

Figure 6:
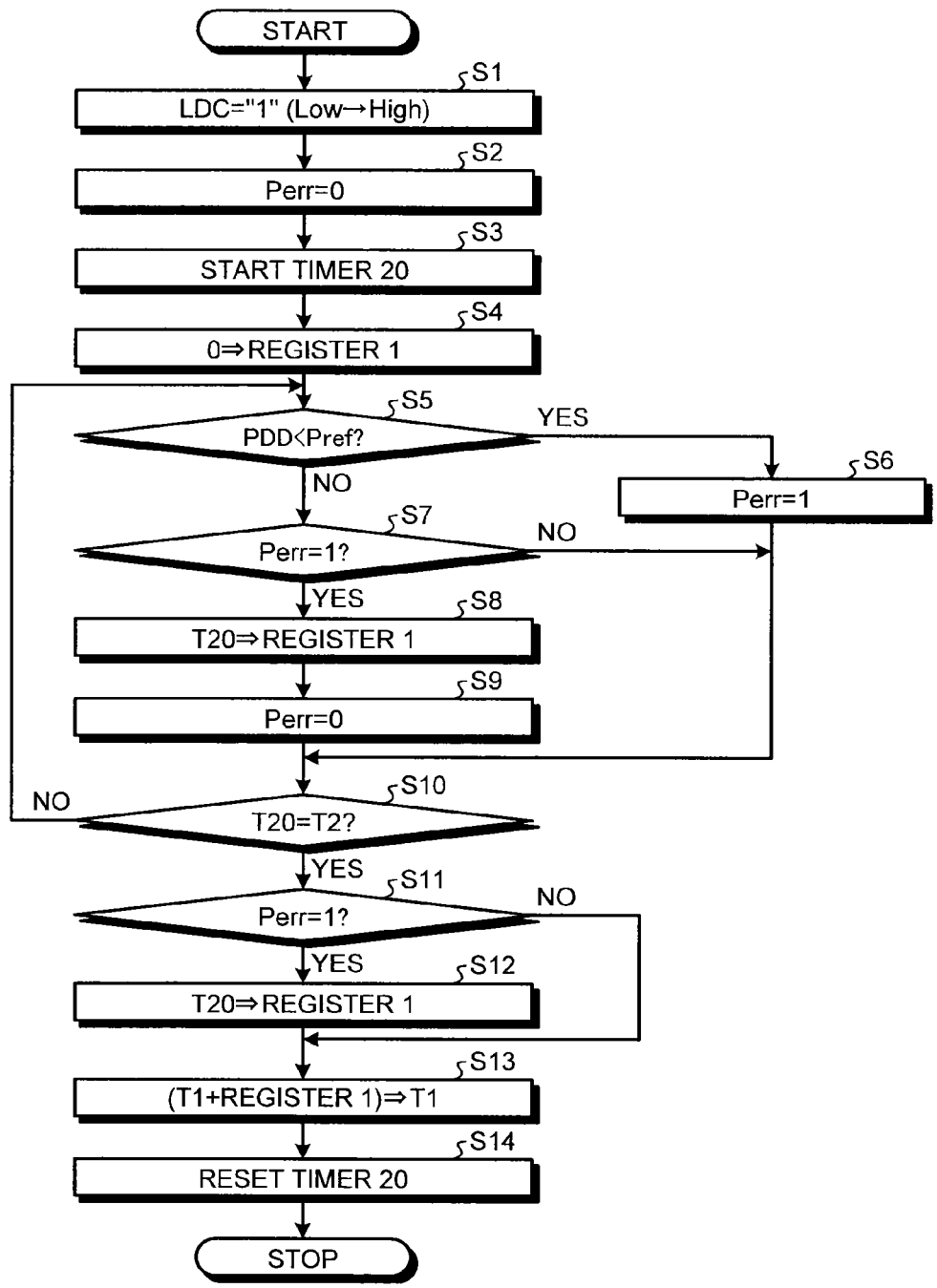
FIG. 6 is a flow chart illustrating an exemplary operation of a control unit 1 in the second embodiment.

Next, an exemplary operation for the control in the present embodiment will be described with reference to FIG. 6. FIG. 6 is a flow chart illustrating an exemplary operation of the control unit 1.

Herein, T20 represents a time measurement value of timer 20, T0 represents a rotation period of the motor 3, T1 represents an emission start timing data of the excitation light by the LD 9, T2 represents an emission duration time data of the excitation light by the LD 9, and Pref represents an output light data as threshold value stored in the control unit 1.

The control unit 1 firstly generates an internal signal Perr as an error flag. The control unit 1 includes therein a timer 20 and a first register. At an initial state, the signal Perr is set to "0", the timer 20 is reset, and the value in the first register is set to "0". Incidentally, the timer 20 corresponds to the second timer in FIG. 1 and FIG. 5.

After the control unit 1 sets the signal LDC to "1" (step S1), the control unit 1 starts the timer 20 (step S3) and confirms the default values of the signal Perr and the first register (step S2 and step S4). Then, the control unit 1 compares the digital signal PDD input into the control unit 1 with the output light data Pref prestored in the control unit 1 (step S5). If the value of the digital signal PDD is equal to or more than Pref, the process goes to step S7. Then, with the next timing, PDD is compared with Pref.

If it is detected that the value of the input digital signal PDD is smaller than the output light data Pref with any timing (Yes at step S5), the internal signal Perr is set to "1" as an error flag (step S6).

The comparison between the input digital signal PDD and the output light data Pref is repeated until the measurement value of the timer 20 becomes equal to the emission duration time data value T2 of the excitation light (step S10).

If it is detected that the value of the input digital signal PDD becomes equal to or more than the output light data Pref after the internal signal Perr becomes "1", the measurement value T20 of the timer 20 at that time point is written in the first register (step S8) and the internal signal Perr is returned to "0" (step S9). Thereby, the timer count value by the timer 20 at the time point when the value of PDD becomes equal to or more than the output light data Pref is written in the first register. Then, a value obtained by adding the value written in the first register to the previous emission start timing data value T1 of the excitation light is stored as a new T1 (step S13).

On the other hand, if it is not detected that the value of the input digital signal PDD becomes equal to or more than the output light data Pref after the internal signal Perr becomes "1", and the measurement value of the timer 20 reaches the time duration data T2 (Yes at step S11), this value T2 is written in the first register (step S12). Then, a value obtained by adding the value written in the first register to the previous emission start timing data value T1 of the excitation light is stored as a new T1 (step S13).

Owing to the above operations, if it is detected that the value of PDD becomes temporarily smaller than the output light data Pref during the emission duration time T2 of the excitation light, a value T1 indicating the emission start timing is set so as to avoid such a time range during which the value of PDD is smaller than the output light data Pref. Thereby, the output timing of the signal LDC to be output from the control unit 1 is controlled in accordance with the set value T1. Thus, the emission start timing of the LD 9 is determined so as to avoid the time range during which the value of PDD is smaller than the output light data Pref.

If it is detected that the value of PDD becomes smaller than the output light data Pref during the emission duration time T2 of the excitation light, and such a state continues until the timer count value by the timer 20 becomes T2, the similar detecting operation is performed for the next emission duration time T2 like as mentioned above.

Figure 7:
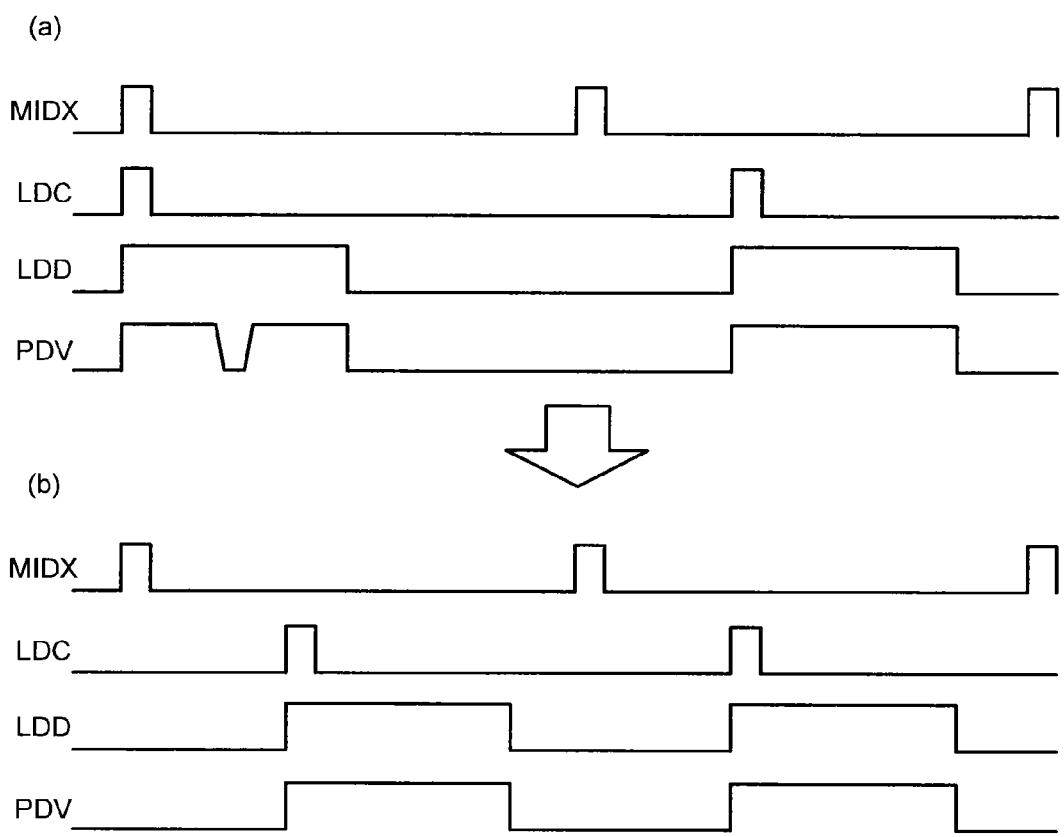
FIG. 7 is a timing chart illustrating an operation of the light source device according to the second embodiment.

FIG. 7 illustrates the above operation in timing charts ((a) and (b)). In the timing chart (a), it is detected that a value of the detected signal is equal to or less than a predetermined level, and the emission timing of the LD 9 is changed by the control unit. In the timing chart (b), the LD 9 is driven with such a changed timing, after that.

The output light data may be also stored in the memory 11 like as the other data. For example, when the device is turned on, the control unit 1 may read out the output light data from the memory 11 via the memory bus MBI and store it into the register provided therein.

Next, effects of the second embodiment will be explained.

In the present embodiment, in the light source device capable of emitting a light in a predetermined wavelength range with a predetermined period, the fluorescent layer 7 is formed on the rotating wheel disc 6 in the circumferential direction. And, the fluorescent wheel is rotated so that a part of the fluorescent layer 7 is irradiated with the excitation light and the light in the predetermined wavelength range is emitted with the predetermined time period. The emission timing of the excitation light can be controlled relative to the rotation of the fluorescent layer 7 by monitoring a part of the output fluorescent light with the photosensor 22.

Thereby, even if the fluorescent layer has any defect region partially which may affect the quality of the output fluorescent light, it is possible to control the light emission so as to avoid such a defect region. Thereby, it is possible to realize the light source device capable of displaying a high quality image with high reliability at a low cost.

In general, in the light source device, the emission timing of the excitation light may be controlled by the user himself/herself manually. However, such a manual operation involves complicated operations or extra efforts.

In contrast, according to the present embodiment, the light source device is provided with the light receiving unit for detecting the emission status of the fluorescent light, so that the emission timing of the excitation light is controlled in accordance with the emission status. Therefore, it is possible to realize the light source device superior in its operability like appliances without involving the use's complicated operations.

Third Embodiment

Next, a light source device according to a third embodiment will be described. The same configuration with the aforementioned second embodiment is not repeatedly explained. The different operations from the second embodiment will be described.

Figure 8:
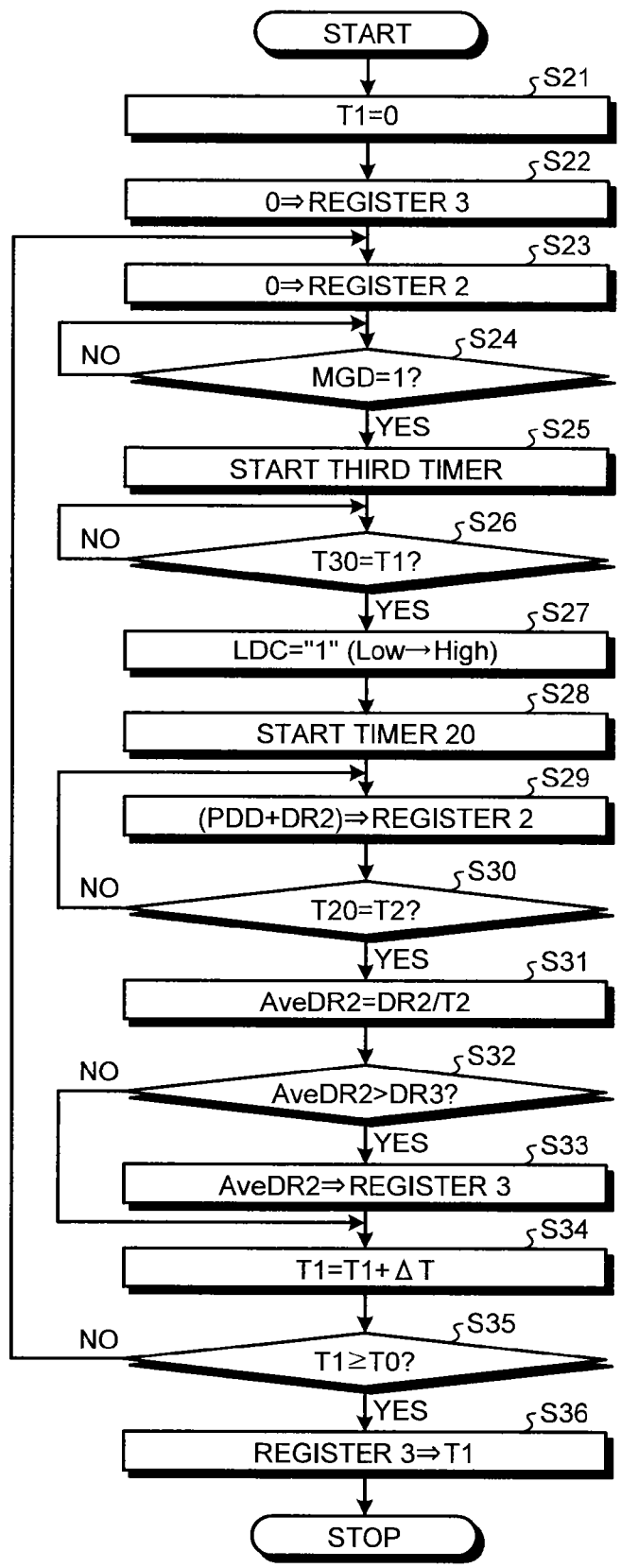
FIG. 8 is a flow chart illustrating an exemplary operation of a control unit 1 in a third embodiment.

FIG. 8 is a flow chart illustrating an exemplary operation of the control unit 1 according to the third embodiment.

Herein, T0 represents a rotation period of the motor 3, T1 represents an emission start timing data of the excitation light by the LD 9, T2 represents an emission duration data of the excitation light by the LD 9, T30 represents a time measurement value of the third timer, DR2 represents a previous value of a second register, DR3 represents a previous value of a third register, and ΔT represents the minimum resolution time for switching timings.

The control unit 1 firstly sets the stored emission start timing data value of the excitation light to "0" (step S1). The control unit 1 also therein includes the second register and the third register. At the initial state, "0" is written in both of the second and third registers (step S22 and step S23).

If it is detected that the signal MGD becomes "1" and the rotation of the motor becomes steady (Yes at step S24), the control unit 1 starts the third timer (step S25), and waits for its time measurement value T30 to reach the emission start timing data T1 (step S26). Since T1 is "0" at the initial state as mentioned above, the process goes to the next step without any substantial waiting time, and the signal LDC is set to "1" as mentioned above (step S27). If the signal LDC becomes "1", the timer 20 starts as mentioned above (step S28).

Until the emission duration time T2 of the excitation light elapses after the timer 20 starts, the control unit 1 repeats the operation to update the value in the second register by adding the value of the input digital signal PDD to the previous value DR2 in the second register, and writing the obtained value in the second register (step S29).

If the time measurement value of the timer 20 reaches T2 (Yes at step S30), the value DR2 in the second register at that time point is divided by the value T2 to obtain the average value AveDR2 of the input digital signal PDD (step S31).

The control unit 1 compares the calculated average value AveDR2 with the previous value in the third register (step S32). If the average value is larger than the previous register value, the average value is written in the third register (step S33).

The control unit 1 repeats the operation from the step S23 to the step S33 while shifting the emission start timing data of the excitation light by ΔT, until T1 reaches the rotation period T0 of the motor 3 (step S35).

If the T1 becomes the rotation period T0 of the motor 3 (Yes at step S35), a value written in the third register at that time is stored as the emission start timing data T1 of the excitation light (step S36).

By the aforementioned operation, the control unit 1 can set the emission start timing data T1 of the excitation light so that the average value AveDR2 of the input signal PDD becomes maximum.

Thereby, the output timing of the signal LDC to be output from the control unit 1 can be arranged in accordance with T1. The emission start timing of the LD 9 can be arranged so that the average value AveDR2 of the input signal PDD becomes maximum.

Next, effects of the third embodiment will be explained.

In general, if the same region on the fluorescent wheel is continuously irradiated with the excitation light for a long time, the fluorescent material only in that region deteriorates over time. This may lower the display quality.

In contrast, according to the present embodiment, the fluorescent layer formed on the wheel is entirely detected for its emission status, and the emission timing is controlled so as to obtain the maximum emission light intensity. Therefore, if the emission light intensity decreases because of a partially deterioration and the like of the fluorescent layer over time, it is possible to maintain the emission light intensity for a long time by avoiding the deteriorated region. Thus, the light source device with high quality and long life can be provided.

Fourth Embodiment

Next, a light source device according to a fourth embodiment will be described. The same configuration with the aforementioned second and third embodiments is not repeatedly explained. The different configuration and operation from the second and third embodiments will be explained.

Figure 9:
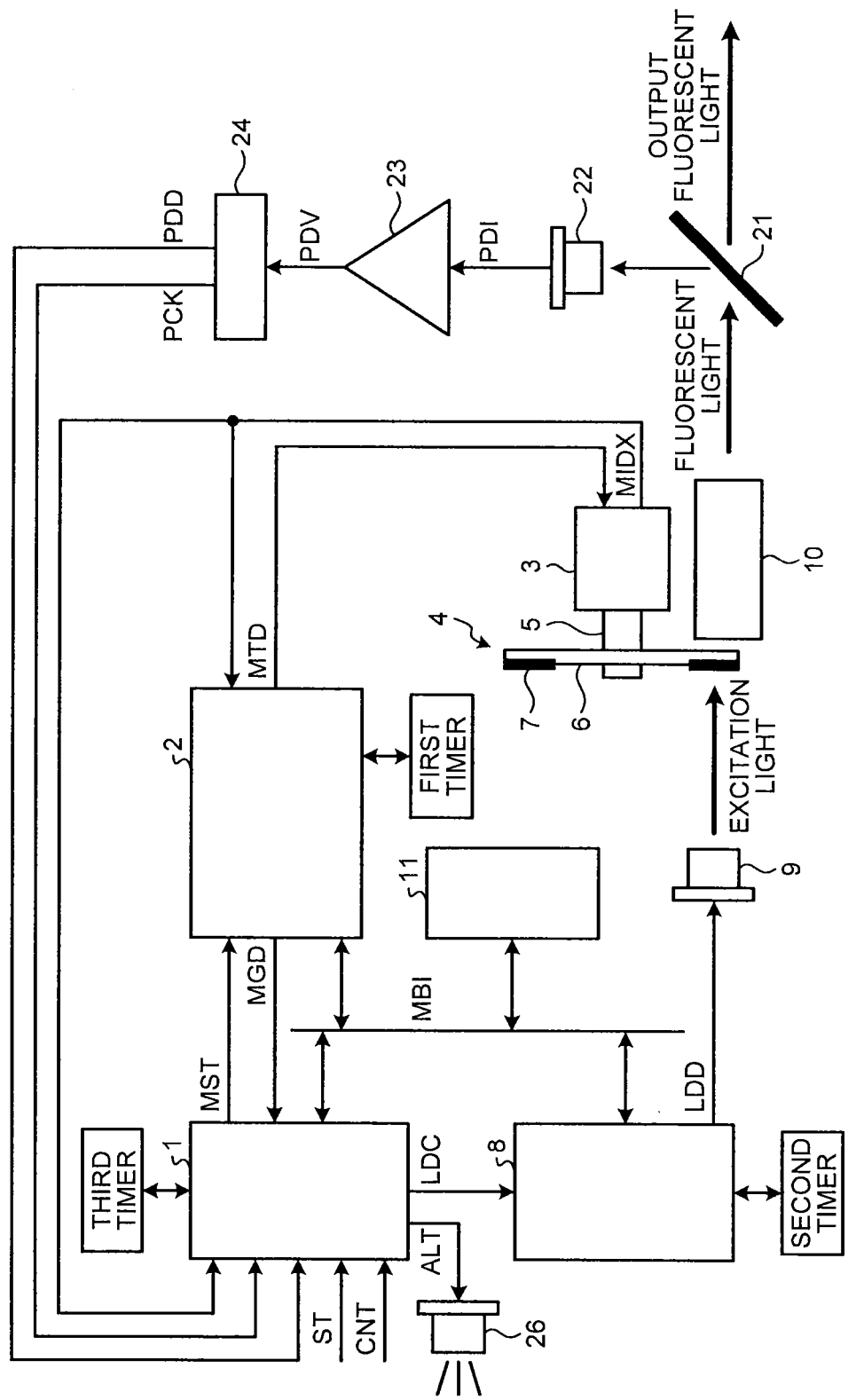
FIG. 9 is a schematic view illustrating a light source device according to a fourth embodiment.

FIG. 9 schematically illustrates a light source device according to the fourth embodiment.

The light source device according to the fourth embodiment is provided with an LED 26 for an alarm display use, in addition to the configuration illustrated in FIG. 5. This LED 26 is controlled on the basis of a control signal ALT output from the control unit 1.

Figure 10:
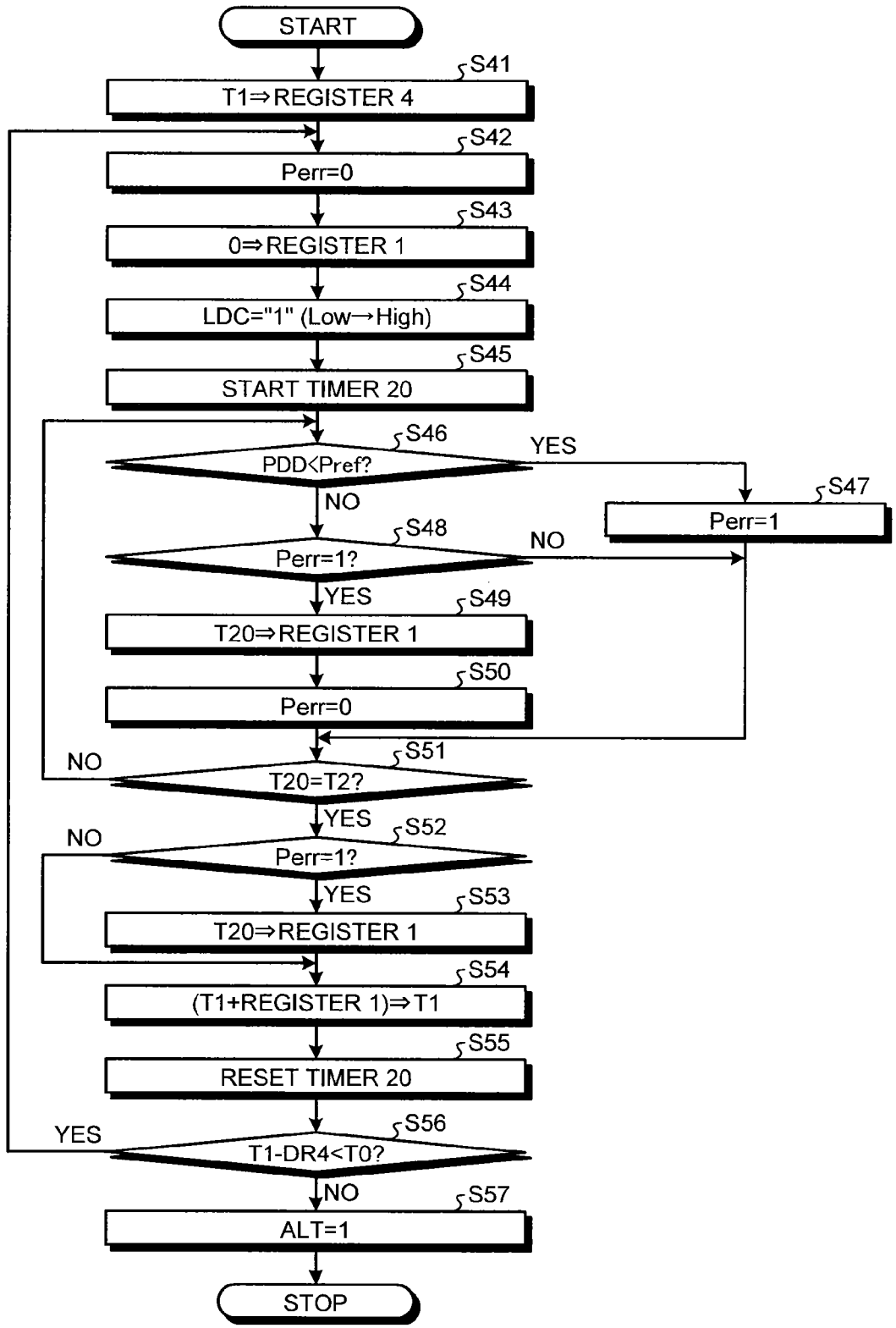
FIG. 10 is a flow chart illustrating an exemplary operation of a control unit 1 in the fourth embodiment.

Next, an exemplary operation for the control in the present embodiment will be described with reference to FIG. 10. FIG. 10 is a flow chart illustrating an exemplary operation of the control unit 1 in the fourth embodiment.

Herein, T20 represents a time measurement value of the timer 20, T0 represents a rotation period of the motor 3, T1 represents an emission start timing data of the excitation light by the LD 9, T2 is an emission duration time of the excitation light by the LD 9, Pref represents output light data as threshold value stored in the control unit 1, and DR4 represents a value in a fourth register.

The control unit 1 therein includes the fourth register to store a default value of the emission start timing data of the excitation light. Similarly to the case of FIG. 8, the internal signal Perr is set to "0", the timer 20 is reset, and the value in the first register is set to "0" (steps S41 to S43).

The control unit 1 sets the signal LDC to "1" (step S44), and stars the timer 20 (step S45). The control unit 1 compares the input digital signal PDD with the output light data Pref prestored therein (step S46). If the value of PDD is equal to or more than Pref, the process goes to step S48. At the next timing, PDD is compared with Pref.

If it is detected that the value of the input digital signal PDD becomes smaller than the output light data Pref with any timing (Yes at step S46), the internal signal Perr is set to "1" as an error flag (step S47).

The comparison between the input digital signal PDD and the output light data Pref is repeated until the measurement value of the timer 20 reaches the emission duration data value T2 of the excitation light (step S51).

If it is detected that the value of the input digital signal PDD becomes equal to or more than the output light data Pref after the internal signal Perr becomes "1", the measurement value of the timer 20 at that time point is written in the first register (step S49) and the internal signal Perr is returned to "0" (step S50). Thereby, the timer count value by the timer 20 at a time point when the value of PDD becomes equal to or more than the output light data Pref is written in the first register. A value obtained by adding a value written in the first register to the previous emission start timing data value T1 of the excitation light is stored as a new T1 (step S54).

On the other hand, if it is not detected that the value of the input digital signal PDD becomes equal to or more than the output light data Pref after the internal signal Perr becomes "1" and the measurement value of the timer 20 reaches the time duration data T2 (Yes at step S52), this value T2 is written in the first register (step S53). A value obtained by adding the value written in the first register to the previous emission start timing data value T1 of the excitation light is stored as a new T1 (step S54).

Next, the difference between the new T1 updated at the step S54 and the default value of T1 (DR4) stored in the fourth register is calculated. If the calculated difference is smaller than the rotation period T0 of the motor 3 (Yes at step S56), the internal signal Perr is set to "0", the timer 20 is reset and the value in the first register is set to "0" to repeat the operation from the step S42 to the step S55.

On the other hand, if the calculated difference is equal to or more than the rotation period of the motor 3 (No at step S56), it is judged that the emission timing of the excitation light cannot be controlled so that the emission light intensity of the fluorescent light is not lowered to or than a predetermined threshold. Therefore, the control unit 1 sets the alarm signal ALT to "1" (step S57).

The alarm signal ALT is input to the LED 26 as illustrated in FIG. 9. Thereby, if the alarm signal ALT is set to "1" through the aforementioned operation, the LED 26 emits a light to inform an error or abnormality to the user. Thus, the LED 26 functions as the alarm generating unit.

In the present embodiment, a configuration that the LED 26 as light emitting device emits a light is illustrated as an example of the alarm generating unit to inform the abnormality. However, the alarm generating unit is not limited to this configuration insofar as it can inform the abnormality. For example, a sound unit such as buzzer may be used to inform the abnormality by sound. Alternatively, the light source device may be further provided with a sound output system to inform the abnormality to the user by sound. Furthermore, a display device such as LCD (Liquid Crystal Display) may be used to inform the abnormality to the user by displaying a message. Thus, the alarm generating unit can be realized in various manners.

If the alarm signal ALT is set to "1" in the aforementioned embodiment, the emission of the excitation light may be halted or stopped in addition to generating the alarm as mentioned above, as the alarm generating unit.

Next, effects of the fourth embodiment will be explained.

If the fluorescent layer 7 formed on the wheel disc 6 of the fluorescent wheel 4 has any defect region partially which may affect the image display quality and the defect region is inevitable, the user cannot know why the image display quality is deteriorated unless any way to inform the situation to the user. This is a problem, since an appropriate solution cannot be taken.

In contrast, according to the present embodiment, even if the fluorescent layer 7 has a lot of defect regions and the emission timing of the excitation light cannot be controlled so that the emission light intensity of the fluorescent light is not lowered to or than the threshold value, it is possible to inform the situation to the user by an alarm. Thereby, the user can be aware of the cause of the abnormality immediately, and can take the appropriate measures. Thus, even if the error or abnormality occurs, the user is not bothered for a long time.

Since the sound unit such as buzzer generates a sound and/or the light emitting device such as LED 26 emits a light, as a configuration of the alarm generating unit to inform the abnormality, the user can be easily aware of the cause of the abnormality.

In general, in this type of light source devices, extremely high power laser light is often used as the excitation light. According to the present embodiment, if the fluorescent layer has a lot of defect regions and it is difficult to emit the excitation light so as to avoid such defect regions, the emission of the excitation light can be halted or stopped in addition to generating the alarm. Thereby, if any unexpected error or abnormality occurs in the devices, the high power laser light can be prevented from being output directly to the outside of the device.

Fifth Embodiment

Figure 11:
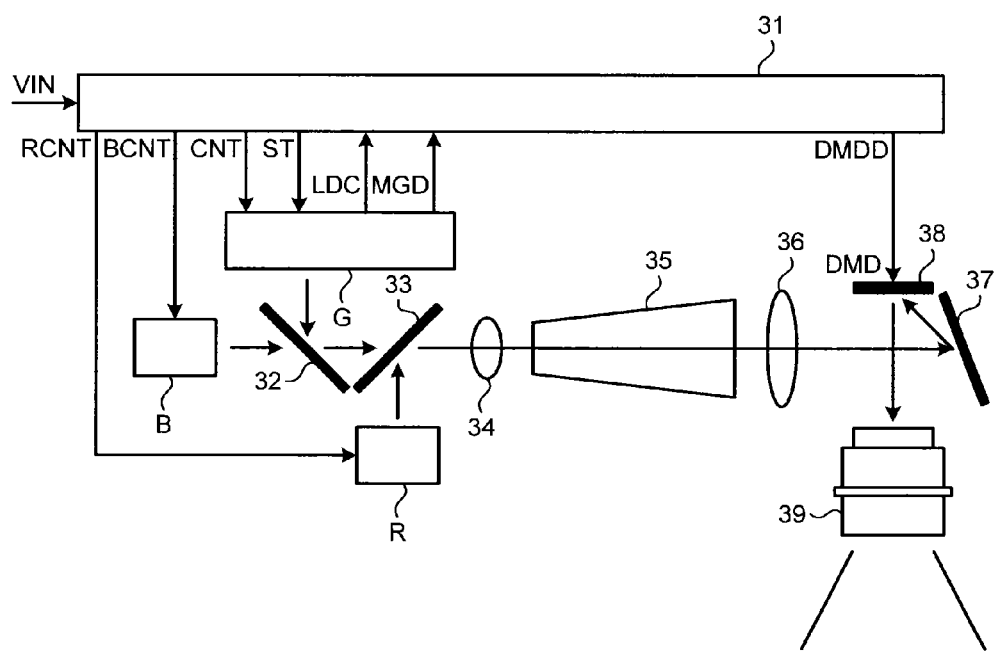
FIG. 11 is a schematic view illustrating a projection display apparatus according to a fifth embodiment.

FIG. 11 schematically illustrates a projection display apparatus according to a fifth embodiment. The light source device G, which may be the light source device illustrated in FIG. 1 or FIG. 5 for example, outputs a light in green wavelength range. The light source device B and the light source device R output a light in blue wavelength range and a light in red wavelength range, respectively, for which LEDs or lasers are used as light sources.

If a video signal VIN is input to a video processing unit 31, the video processing unit 31 outputs a control signal CNT from its frame frequency, so that the rotation speed data of the motor, the emission start timing data of the excitation light and the emission duration time data of the excitation light are set as mentioned above in the light source device G. Then, the start signal ST is set to "1" to drive the motor and rotate the fluorescent wheel in the light source device G.

If the rotation speed of the motor reaches a desired value, the motor drive unit in the light source device G sets the signal MGD to "1" as mentioned above. If the signal MGD becomes "1", the light source device G outputs the signal MGD and the emission timing signal LDC of the fluorescent light to the video processing unit 31.

If the video processing unit 31 receives the emission timing signal LDC, the video processing unit 31 generates and outputs signals BCNT and RCNT in accordance with the receiving timing, so that a blue light is emitted from the light source device B and a red light is emitted from the light source device R with predetermined timings, respectively. Additionally, display signals for each of red, green, and blue are generated from the video signal VIN, and they are converted into and output as a signal DMDD to drive a DMD 38 which is a display device.

The red light, the green light, and the blue light emitted from the light source devices R, G, and B, respectively are synthesized by a first dichroic mirror 32 and a second dichroic mirror 33, and then collected by a collecting lens 34 to be directed to a rod integrator 35. The light emitted from the rod integrator 35 is irradiated to a display pixel region of the DMD 38 by an illumination lens 36 and a reflecting mirror 37. An illumination optical system is composed of the collecting lens 34, the rod integrator 35, and the illumination lens 36. The illumination light entered the DMD 38 is modulated to an image light and projected to a screen or the like through a projection optical system 39, so that an image is displayed.

Next, effects of the fifth embodiment will be explained.

The present embodiment aims to provide a projection display apparatus capable of displaying a high quality image with high reliability by using the light source device according to any of the first to fourth embodiments, even if the fluorescent layer formed on the fluorescent wheel has a defect region partially which may affect an image display quality.

According to the present embodiment, the light source device according to any of the first to fourth embodiments is used as a light source for a predetermined wavelength range in the projecting display apparatus. Thereby, it is possible to realize a low cost, high reliable and high quality projection display apparatus.

Sixth Embodiment

Next, a projection display apparatus according to a sixth embodiment will be explained. The same configuration with the fifth embodiment is not repeatedly explained. The different configuration and operation from the fifth embodiment will be described.

Figure 12:
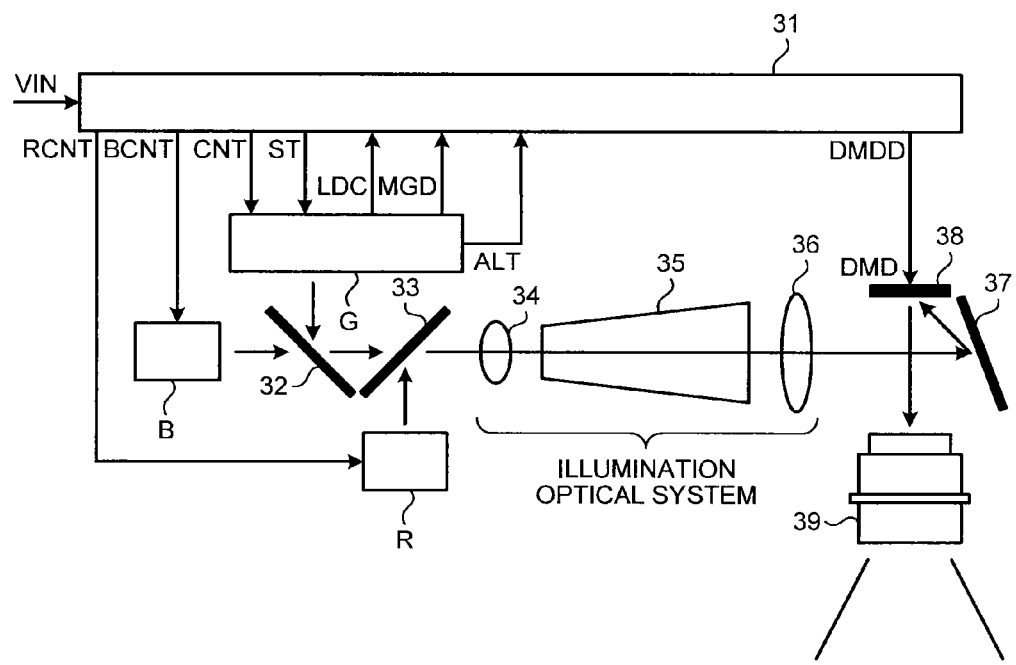
FIG. 12 is a schematic view illustrating a projection display apparatus according to a sixth embodiment.

FIG. 12 schematically illustrates the projection display apparatus according to the sixth embodiment.

The light source device G, which may be the light source device according to the fourth embodiment as illustrated in FIG. 9, outputs a light in a green wavelength range. The light source device B and the light source device R output a light in a blue wavelength range and a light in a red wavelength range, respectively, for which LEDs, lasers or the like are used as light sources.

The projection display apparatus according to the sixth embodiment is provided with a configuration to output the alarm signal ALT mentioned in the fourth embodiment to the video processing unit 31 from the light source device G, in addition to the configuration illustrated in FIG. 11.

Figure 13:
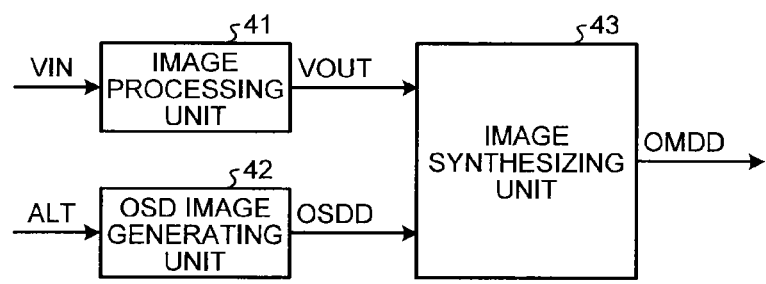
FIG. 13 is a schematic view illustrating a configuration around an image synthesizing unit in the sixth embodiment.

FIG. 13 schematically illustrates only a part relating to the present embodiment in the video processing unit 31 illustrated in FIG. 12.

As illustrated in FIG. 13, the video signal VIN input from the outside is input to a video processing unit 41 where the data processing is performed as appropriate, and output as a display video signal VOUT.

On the other hand, an OSD image generating unit 42 generates an OSD image data OSDD in response to the input of the aforementioned alarm signal ALT, or in response to a user's operation via a remote controller, an operation panel and the like.

An image synthesizing unit 43 synthesizes the display video signal VOUT and the OSD image data OSDD to generate and output the signal DMDD for driving the DMD 38 which is a display device.

Figure 14:
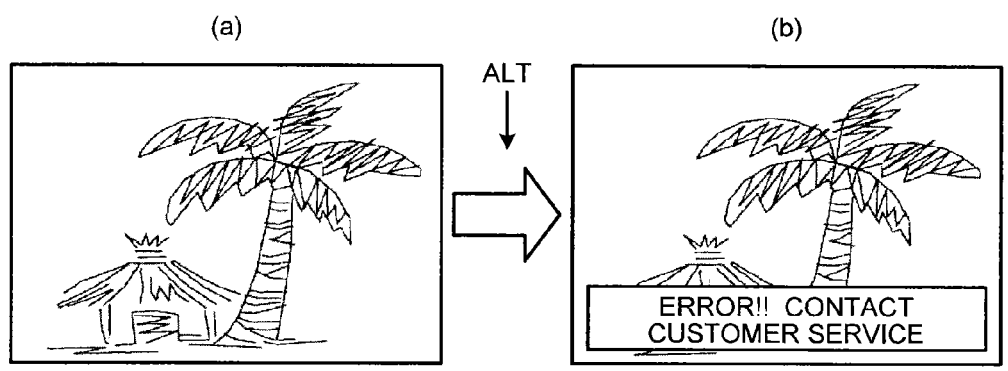
FIG. 14 is a view illustrating an exemplary alarm display image in the sixth embodiment.

FIG. 14 illustrates an example of the alarm display when the alarm signal ALT becomes "1". An image (a) in FIG. 14 (hereinafter called FIG. 14(*a*)) illustrates a projection display image in a normal state before the signal ALT becomes "1". An image (b) in FIG. 14 (hereinafter called FIG. 14(*b*)) illustrates a exemplary projection display image in an abnormal state when the signal ALT becomes "1". In the example of FIG. 14(*b*), a message "ERROR!! CONTACT CUSTOMER SERVICE" is synthesized as the OSD image for the alarm display.

The OSD image for the alarm display is not limited to the above example and may be freely arranged insofar as it can inform any error or abnormality.

Next, effects of the sixth embodiment will be explained.

The projection display apparatus according to the present embodiment is provided with the light source device according to the fourth embodiment. Thereby, if the fluorescent layer has a lot of defect regions and the emission timing of the excitation light cannot be controlled so that the emission light intensity of the fluorescent light is not lowered to or than a predetermined threshold value, it is possible to inform such a situation by displaying the alarm message or the like on the projection screen. Thereby, the alarm for informing any error or abnormality can be displayed so as to be further recognizable to the user. Furthermore, the cause of the error or abnormality can be informed or displayed more clearly. Thereby, it becomes easier to select or take any appropriate solution or measure.

The aforementioned various embodiments are preferred embodiments of the present invention. The present invention is not limited to these embodiments and can be embodied in various modifications based on the technical ideas of the present invention.

For example, the present invention is not limited to the DLP type projector, and can be applied to various projectors such as field sequential type projectors and any other kind of projectors using fluorescent wheels. The same effect can be obtained also in these various modifications.

According to the present invention, even if the fluorescent layer formed on the fluorescent wheel has a defect region partially which may affect the image display quality, it is possible to emit the light so as to avoid such a defect region. Thus, the light source device and the projection display apparatus can be provided at low cost, and with high reliability and high quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
   an excitation light source configured to emit and stop an excitation light with a predetermined timing;
   a fluorescent wheel configured to rotate, the fluorescent wheel including a fluorescent material applied thereon for emitting a fluorescent light in a predetermined wavelength range when irradiated with the excitation light; and
   an irradiation spot changing unit configured to change a spot on the fluorescent material irradiated with the excitation light,
   wherein:
   the excitation light source emits the excitation light with a predetermined period, and
   if a time duration during which an emission light intensity of the fluorescent light is at least lower than a predetermined value is detected in an emission duration time of the fluorescent light in the predetermined period, the irradiation spot changing unit controls an emission timing of the excitation light source so that a region of the fluorescent material corresponding to the time duration is not irradiated with the excitation light.

2. The light source device according to claim 1, wherein the predetermined period is variable, and
   if the predetermined period changes, a rotation speed of the fluorescent wheel changes synchronously in accordance with a change of the predetermined period.

3. The light source device according to claim 1, wherein an emission duration time of the excitation light in the predetermined period is variable.

4. The light source device according to claim 1, further comprising
   a light receiving unit configured to detect an emission status of the fluorescent light, wherein
   the irradiation spot changing unit controls the emission timing of the excitation light on the basis of the emission status of the fluorescent light detected by the receiving unit.

5. The light source device according to claim 1, wherein
   the irradiation spot changing unit sequentially shifts the emission timing of the excitation light so that the emission light intensity of the fluorescent light in the emission duration time of the fluorescent light in the predetermined period becomes maximum.

6. The light source device according to claim 5, wherein the predetermined period is variable, and
   if the predetermined period changes, a rotation speed of the fluorescent wheel changes synchronously in accordance with a change of the predetermined period.

7. The light source device according to claim 1, wherein
   the irradiation spot changing unit sequentially shifts the emission timing of the excitation light so that an average emission light intensity of the fluorescent light in the emission duration time of the fluorescent light in the predetermined period becomes maximum.

8. The light source device according to claim 1, further comprising
   an alarm generating unit configured to generate an alarm, if the emission timing of the excitation light with which the emission light intensity of the fluorescent light in the emission duration time of the fluorescent light in the predetermined period does not become equal to or less than does not exist, wherein
   the irradiation spot changing unit includes the alarm generating unit.

9. The light source device according to claim 8, wherein the alarm is generated by generating a sound and/or lighting a light emitting device.

10. The light source device according to claim 8, wherein when generating the alarm, the alarm generating unit stops an output of the excitation light, in addition to generating the alarm.

11. A projection display apparatus comprising:
the light source device according to claim 1;
two or more kinds of light source devices configured to emit lights each having a wavelength range different from the fluorescent light emitted from the light source device;
a display device;
an illumination optical system configured to irradiate the display device by collecting the fluorescent light and the lights emitted from each of the two or more kinds of light source devices to a predetermined plane;
a projection optical system configured to project an image emitted from the display device to a screen; and
a display control unit configured to control the light source device and the display device.

12. A projection display apparatus comprising:
the light source device according to claim 8;
two or more kinds of light source devices configured to emit lights each having a wavelength range different from the fluorescent light emitted from the light source device;
a display device;
an illumination optical system configured to irradiate the display device by collecting the fluorescent light and the lights emitted from each of the two or more kinds of light source devices to a predetermined plane;
a projection optical system configured to project an image emitted from the display device to a screen; and
a display control unit configured to control the light source device and the display device, wherein
in a case that the alarm generating unit generates the alarm, the display control unit controls the light source device and the display device so as to include a predetermined message in an image to be displayed by the display device.

13. A light source device, comprising:
an excitation light source to emit excitation light;
a motor;
a fluorescent wheel to rotate using the motor, the fluorescent wheel including a fluorescent material for emitting fluorescent light when irradiated with the excitation light;
a detector which detects the fluorescent light which has been emitted; and
a controller to control the excitation light irradiated on the fluorescent material,
wherein:
the excitation light source emits the excitation light with a predetermined period, and
if a time duration during which an emission light intensity of the fluorescent light is at least lower than a predetermined value is detected by the detector in an emission duration time of the fluorescent light in the predetermined period, the controller controls an emission timing of the excitation light source so that a region of the fluorescent material corresponding to the time duration is not irradiated with the excitation light.

* * * * *